(12) United States Patent
Brown

(10) Patent No.: US 8,149,855 B2
(45) Date of Patent: Apr. 3, 2012

(54) METHOD FOR TRANSFERRING DATA PACKETS TO A SHARED RESOURCE, AND RELATED DEVICE AND COMPUTER SOFTWARE

(75) Inventor: Patrick Brown, Cagnes sur Mer (FR)

(73) Assignee: France Telecom, Paris (FR)

( * ) Notice: Subject to any disclaimer, the term of this patent is extended or adjusted under 35 U.S.C. 154(b) by 236 days.

(21) Appl. No.: 12/524,964

(22) PCT Filed: Jan. 24, 2008

(86) PCT No.: PCT/FR2008/050114
§ 371 (c)(1),
(2), (4) Date: Oct. 2, 2009

(87) PCT Pub. No.: WO2008/104650
PCT Pub. Date: Sep. 4, 2008

(65) Prior Publication Data
US 2010/0054269 A1    Mar. 4, 2010

(30) Foreign Application Priority Data
Jan. 30, 2007    (FR) .................................... 07 00602

(51) Int. Cl.
*H04L 12/28* (2006.01)
*H04L 12/56* (2006.01)

(52) U.S. Cl. ...................................................... 370/412
(58) Field of Classification Search ............. 370/395.42, 370/395.43, 412; 709/214, 215
See application file for complete search history.

(56) References Cited

U.S. PATENT DOCUMENTS

| | | | |
|---|---|---|---|
| 7,391,786 B1 * | 6/2008 | Prasad et al. ................... | 370/412 |
| 7,436,844 B2 * | 10/2008 | Wang et al. ................... | 370/412 |
| 7,685,250 B2 * | 3/2010 | Connor et al. ................ | 709/214 |
| 2003/0214952 A1 | 11/2003 | Novick | |
| 2006/0206579 A1 | 9/2006 | Connor et al. | |

\* cited by examiner

*Primary Examiner* — Ayaz Sheikh
*Assistant Examiner* — Blanche Wong
(74) *Attorney, Agent, or Firm* — Drinker Biddle & Reath LLP

(57) ABSTRACT

The invention relates to a method for transferring data packets to a shared resource (12) in a telecommunication network, that comprises the following steps: providing N processing queues ($Q_i$, i=i to N) each associated with a respective period having a predetermined duration, where N>1; based on information indicated by a received packet, allocating said packet to one of the processing queues; adding the received packet (P13) in the queue ($Q_i$) to which it has been allocated; selecting a processing queue from the N queues so that each non-empty queue is selected at least once during the associated period; and extracting at least one packet from the selected processing queue and transferring it in priority to the shared resource (12).

7 Claims, 2 Drawing Sheets

METHOD FOR TRANSFERRING DATA PACKETS TO A SHARED RESOURCE, AND RELATED DEVICE AND COMPUTER SOFTWARE

CROSS-REFERENCE TO RELATED APPLICATIONS

This application is the U.S. national phase of the International Patent Application No. PCT/FR2008/050114 filed Jan. 24, 2008, which claims the benefit of French Application No. 07 00602 filed Jan. 30, 2007, the entire content of which is incorporated herein by reference.

FIELD OF THE INVENTION

The present invention lies within the field of telecommunications networks and relates to the allocating of resources of the network.

BACKGROUND OF THE INVENTION

The invention finds an application most particularly in the Internet network.

Within the framework of a communication between an origin terminal and a recipient terminal, packets are provided successively by the origin terminal to the telecommunications network, for example the Internet network. Each of these packets is thereafter transmitted up to the recipient terminal by way of resources of the Internet network.

The resources of the Internet network comprise all the means adapted for allowing the transmission of the packets. These means receive packets as input and deliver packets as output. The resources comprise for example the physical connections, based on cable, optical fiber or radio, between equipment of the network. They also comprise equipment, such as, for example, routers etc.

The use of the resources is snared between the packets. When the number of packets that have to use one and the same resource is too big, this gives rise to overcrowding phenomena, also called network congestion, located especially at the level of the resource for a period of variable duration. A packet that has to be processed by a resource experiencing an overcrowding phenomenon may then experience a particularly long waiting time before actually being processed by the resource.

The technique generally implemented by default in the Internet network equipment to decide the allocation of the resources to the packets is termed "Best Effort". The packets are dispatched by an item of equipment to a resource in the order in which they are received by the item or equipment. This "Best Effort" generally produces acceptable performance. When occasional or prolonged congestion occurs, this performance may nevertheless deteriorate. When resources offered are low in capacity, such as for example radio accesses, these congestion periods may turn out to be penalizing for users. And even in the presence of bigger capacities, congestion periods may nevertheless take place, on account especially of the increasing data volumes utilized by Internet network users.

Solutions have been proposed for decreasing the occurrence and the duration of overcrowding phenomena.

A first type of solution consists in classifying the communications as a function of predetermined criteria, such as the origin or the destination of the communication (and therefore the origin or the destination of the packets transmitted within the framework of the communication), or else as a function of the application from which the communication originates. The packets then have access to the shared resource, for example a transmission link or a routing facility, as a function of the classifying of the communication to which they belong. This first type of solution is therefore based on the principle that certain classes of communications have to be sacrificed for the proper operation of other classes. This first type of solution furthermore assumes that the user can define priorities among the applications that he is using and that these priorities are fixed or at least forecastable. This also assumes that the applications from which the communications originate are identifiable, and that, when new applications are used, they are classified.

This first type of solution thus has the drawback of requiring knowledge of the applications which are to be favored or conversely disfavored. Now, the applications present on a network change over time. The solution therefore requires constant updating. Furthermore, it is not always easy for a user to have knowledge of the applications that he sometimes uses without knowing this through third-party applications. Moreover, users often do not wish to be compelled to prioritize certain applications with respect to others, because their preference may depend on their activity or on the period during the day, or because they do not consider it to be possible to measure the consequences thereof on performance. The implementation of solutions of this type penalizes certain applications.

The objective of a second type of solution is to ensure equitable sharing between the communications present. This can be carried out for example with the so-called "Fair queueing" mechanisms.

This second type of solution does not require the establishment by the users of a list of applications to be favored. The throughput is shared between the communications present. Various weightings can be associated with communications of different applications. Nevertheless, with or without weighting, when congestion is prolonged, the number of communications in progress increases, and the performance of all the communications drops without lower limit. The communications are therefore not protected from the behavior of the neighboring communications. Thus certain applications multiply the number of simultaneous communications that they establish, so as to occupy a bigger snare of the network resources.

Finally a third type of solution consists in classifying the communications dynamically as a function of the packets that they have sent, in particular by allocating a priority which decreases as a function of the volume of packets already sent. These so-called "Aged-Based" solutions are efficient when the communications correspond to very different total data volumes transmitted or else when the distribution of these volumes has a very big variance.

Subsequently in this document, a communication which gives rise to the sending of a large total data volume in the form of packets will be called a "long communication" and a communication which gives rise to the sending of a low total data volume in the form of packets will be called a "short communication".

This third type of solution makes it possible to automatically choose the communications to be favored. Nevertheless the priority mechanism implemented interrupts the flow of certain communications to the benefit of other communications. The long communications, especially the communications which last a long time, may be blocked by the accumulation of short communications, especially communications lasting little time.

Furthermore, when such a solution is implemented at various places in a network, for example on several items of equipment situated along the path followed by a communication, it is possible that resources of the network may not be used efficiently and that overcrowding phenomena may appear just where, for example, a solution of the second type would not produce any. Moreover, in the case of a communication of TCP type, the TCP protocol may interpret overcrowding in the transfer of packets which is prolonged as an interruption, and in this case the throughput of the communication is greatly and automatically reduced by a self-adjustment mechanism, and is thereafter re-increased only very gradually, leading to a big drop in the fluidity of processing at the level of the user from whom the communication originates and/or to whom the communication is addressed.

There is therefore a need for a solution aimed at allocating resources to packets not exhibiting the drawbacks of the prior art solutions or at least aimed at decreasing them.

SUMMARY OF THE INVENTION

According to a first aspect, the invention proposes a method of transferring data packets to a shared resource in a telecommunications network, the method comprising the following steps:
  providing N processing queues each associated with a determined duration, where N>1;
  for at least one packet to be transferred, assigning said packet to one of the processing queues;
  adding said packet to the queue to which it has been assigned;
  selecting a processing queue from among the N queues, in such a way that each non-empty queue is selected at least once in the course of a time period of duration corresponding to the duration associated with the queue considered;
  extracting at least one packet from the processing queue selected; and
  transferring the extracted packet to the shared resource by priority with respect to the packets of the other queues.

A method according to the invention makes it possible to markedly reduce the overcrowding problems at the level of the shared resource. It does not necessitate the defining of priorities by a user, nor is it necessary to know the applications that gave rise to the sending of the packets on the network.

A method according to the invention does not interrupt the flow of the packets of certain communications in favor of other communications, but on the contrary guarantees that the packets of all the communications continue to be transferred to the resource.

It is generally considered that a small percentage of the communications are long and represent a large share of the packets transmitted over a network. A method according to the invention makes it possible for the other so-called short communications not to be interrupted by the overloading of the resources caused by processing the packets corresponding to this small percentage of long communications. Continuous flow of the packets of all the communications, short or long, is guaranteed.

In one embodiment, the step of assigning a packet received to one of the queues comprises the following steps:
  identifying a communication stream to which said packet belongs,
  updating a value representative of the data volume received for the communication stream identified;
  determining the assignment queue for the packet received as a function of the result of at least one comparison between said updated value and a determined threshold.

Such a method makes it possible not to overcrowd the resource through the flow of packets corresponding to communications that generate large volumes of data to the detriment of communications that generate low volumes of data. The flow of the packets arising from the latter communications is not blocked, but is guaranteed by the implementation of this arrangement. The communications with a large data volume are not allowed to monopolize the resource and prevent the packets of other communications from being transferred to the resource.

The data volume for a communication is for example measured by the number of packets received that relate to one and the same communication or else by the sum of the size of the packets successively received.

In one embodiment, a method according to the invention comprises a test step of determining, as a function of information contained in a packet, whether this packet satisfies at least one predetermined condition, the assignment queue for the packet considered being dependent on the result of the test step.

In one embodiment, for a packet received, it is decided not to add said packet received to one of the N queues, if this packet satisfies at least one predetermined condition.

In one embodiment, when a packet is received, a check is carried out beforehand to verify whether at least one condition from among the following conditions is fulfilled:
  the packet is sent in accordance with a determined protocol;
  the packet has been sent by a determined application implemented in a source terminal or is intended for a determined application implemented in a recipient terminal;
  the packet belongs to a communication stream whose throughput is less than a determined threshold;
  the packet belongs to a communication stream for which a total number of packets present in said queues is less than a predefined threshold.

Such an arrangement makes it possible to detect the packets of communications of particular types, which require, for example, that the packets be conveyed very rapidly, or else the communications which have a small throughput and which therefore do not overload the resource.

In one embodiment, the assigning of a packet received to a processing queue is carried out as a function of the result of the check. In particular, a packet that has been detected as not contributing to the overloading of the resource, will be added to a queue not receiving packets identified as overloading the resource.

In one embodiment, for a detected packet satisfying at least one of the conditions indicated above, it is decided not to add the packet received to one of the N queues. Here again, this allows packets detected as not overloading the resource or needing particularly fast processing, not to be processed as packets overloading the resource.

According to a second aspect, the invention proposes a device for transferring data packets to a shared resource in a telecommunications network, said device comprising:
  assignment means for assigning a packet to be transferred to a queue from among N processing queues each associated with a determined duration, where N>1;
  means for adding said packet received, to the queue to which it has been assigned by the assignment means;
  selection means for selecting a processing queue from among the N queues in such a way that each non-empty queue is selected at least once in the course of a time period of duration corresponding to the duration associated with the queue considered;

means for extracting at least one packet from the queue selected;

means for transferring an extracted packet to the shared resource by priority with respect to the packets of the other queues.

According to a preferred implementation, the various steps of the method according to the invention are implemented by software, comprising software instructions intended to be executed by a data processor of the device according to the invention and designed to control the execution of the various steps of this method.

Consequently, the invention is also aimed at a program, suitable for being executed by a computer or by a data processor, this program comprising instructions for controlling the execution of the steps of a method such as mentioned above.

The invention is also aimed at an information medium readable by a computer or data processor and comprising instructions of a program such as mentioned above.

The information medium can be any entity or device capable of storing the program. For example, the medium can comprise a storage means, such as a ROM, for example a CDROM or a microelectronic circuit ROM, or else a magnetic recording means, for example a diskette (floppy disk) or a hard disk.

Moreover, the information medium can be a transmissible medium such as an electrical or optical signal, which can be carried via an electrical or optical cable, by radio or by other means. The program according to the invention can in particular be downloaded from a network of Internet type.

Alternatively, the information medium can be an integrated circuit into which the program is incorporated, the circuit being adapted for executing or for being used in the execution of the method in question.

Other characteristics and advantages of the invention will become further apparent on reading the description which follows. The latter is purely illustrative and should be read in conjunction with the appended drawings in which:

DESCRIPTION OF THE PREFERRED EMBODIMENTS

Figure 1:
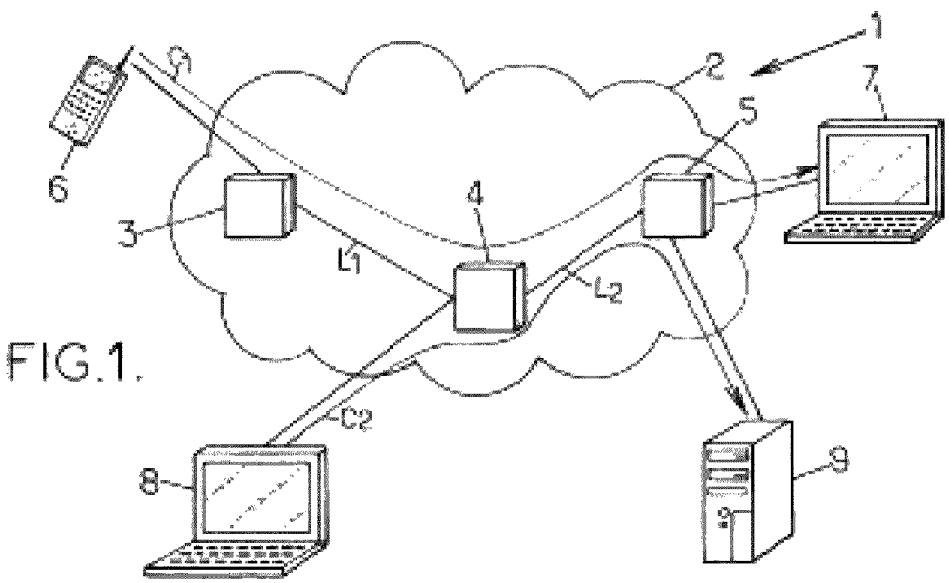
FIG. 1 represents a system implementing the invention in an embodiment.

In FIG. 1 is represented a system 1 in an embodiment of the invention. The system 1 comprises a telecommunications network 2 of Internet type for example.

The network 2 comprises a plurality of items of equipment intended to process packets. Included among these items of equipment are for example items of equipment such as routers, switches, digital subscriber line access multiplexers (DSLAM).

The network 2 furthermore comprises a plurality of communication links, for example of cable, optical fiber, radio type etc, intended to transport packets.

Among these pluralities of items of equipment and links, are represented in FIG. 1 three items of equipment 3, 4, 5 which are for example routers and the communication links L1 and L2 linking these items of equipment 3, 4, 5 together.

These items of equipment and links are intended to allow the implementation of telecommunications between remote entities, including for example a communication C1 between a PDA 6 and a personal computer 7 and a communication C2 between a personal computer 8 and a Web server 9.

An application executed in a terminal from which a communication originates (for example respectively the PDA 6 and the computer 8) gives rise to the sending of a stream of packets destined for a recipient terminal to which the communication is addressed (for example respectively the computer 7 and the Web server 9). These packets follow a determined pathway between the source terminal and recipient terminal and must be processed in the network 2 by a certain number of resources. These resources are shared between packets implementing different communications.

The expression shared resource is understood to mean any processing device within the network receiving, with a view to their processing, multiple packets arising from several communications. Thus included among the shared resources are the items of equipment 3, 4, 5 and the links L1 and L2.

The invention proposes a method that can be implemented to regulate the transfer of packets to one or more shared resource(s), with a view to limiting the phenomena of overcrowding at the level of the shared resource. The method is therefore intended to be implemented upstream of the resource. However it is also possible to implement the method downstream of the resource. Indeed, the effect of regulation downstream of a resource is echoed upstream of this resource because the item of equipment to which the packets are addressed, not only receives these packets with a throughput which is modified on account of this regulation, but also responds thereto with a corresponding modified throughput.

Figure 2:
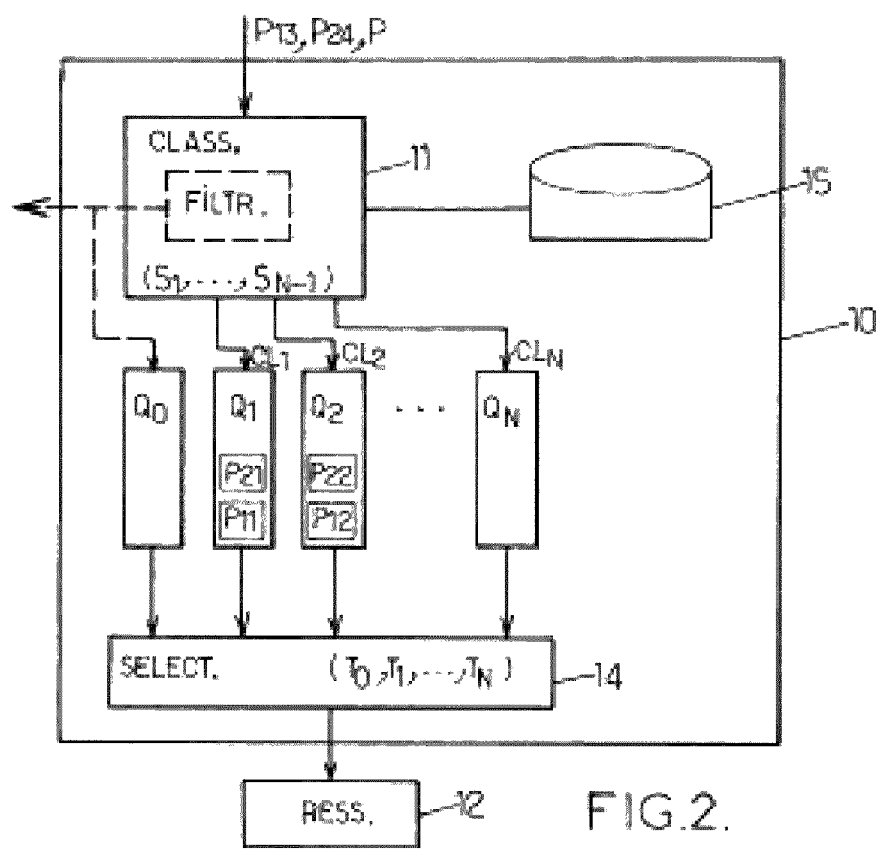
FIG. 2 represents a module for transferring packets to a shared resource, within the system of FIG. 1.

In the particular embodiment considered here, there will be described, with reference to FIG. 2, a packet transfer module 10 arranged within the item of equipment 4 with a view to regulating the transfer of the packets transmitted by the item of equipment 4 to the resource consisting of the link L2.

A similar module is in one embodiment furthermore inserted into the item of equipment 3 to regulate the transfer of the packets transmitted by the item of equipment 3 to the resource consisting of the link L1, and/or arranged upstream of the item of equipment 4 to regulate the transfer of the packets transmitted to the resource consisting of the item of equipment 4 etc.

In a first embodiment, the packet transfer module 10 comprises a block 11 for classifying packets, N queues $Q_1$ to $Q_N$, a block 14 for selecting packets and a memory 15.

In one embodiment, the queues $Q_1$ to $Q_N$ are memories of FIFO type. Each queue is intended to contain packets of an associated respective class. Thus the queue $Q_i$, with i=1 to N, is intended to contain the packets of class $CL_i$.

The memory 15 comprises a plurality of counters. These counters are designed to store a total volume of data already received for a given communication stream, in association with an identifier of this communication stream. The value of the counter is updated either at each packet received, or in accordance with a sampling procedure allowing less frequent updating of the counter. In the second case, if no packet of a communication stream has been sampled, the counter value of this stream will not be stored.

The packet transfer module 10 is adapted for receiving packets corresponding to diverse communications (including for example here the communication C1 from the PDA 6 to the personal computer 7 and the communication C2 between the personal computer 8 and the Web server 9). It is adapted furthermore for regulating the transfer of the packets received to the resource 12 downstream of the module 10 (in the particular case considered, the resource 12 is the communication link L2).

Figure 3:
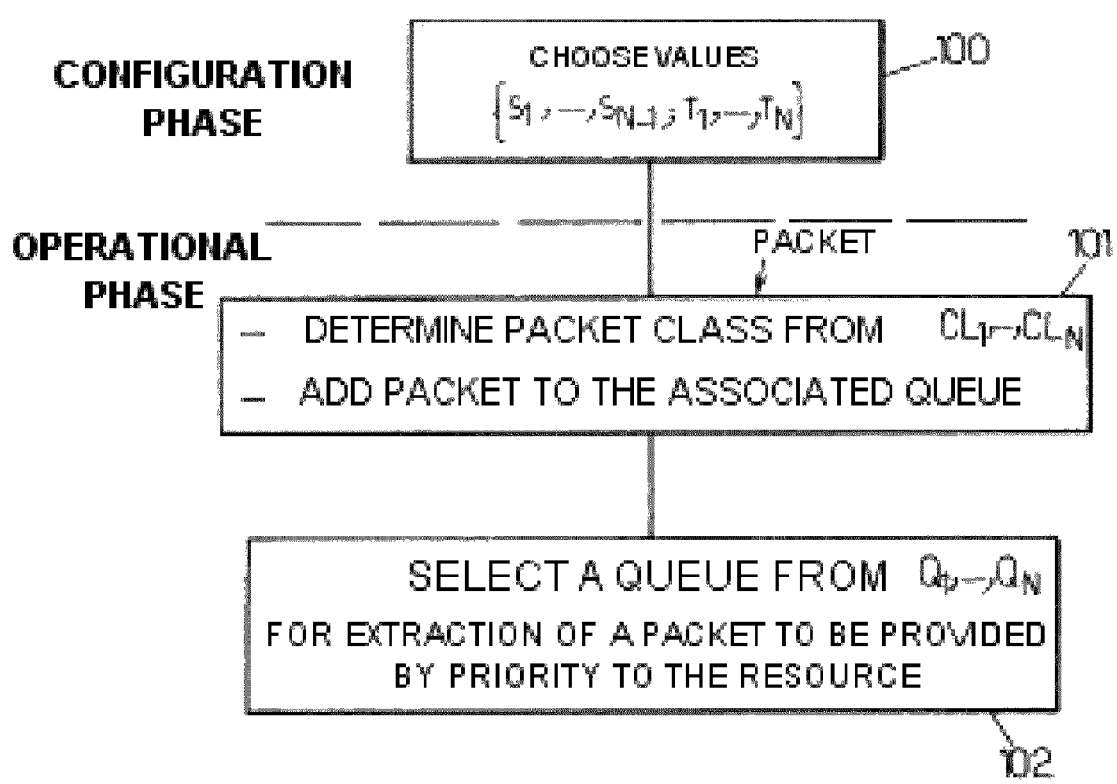
FIG. 3 is a flowchart representing steps of a method of transferring packets in an embodiment of the invention.

The steps implemented by the transfer module 10 are described below with reference to FIG. 3.

In a step 100 of configuring the packet transfer module 10, prior to the operational phase, respective values are allocated to each of N−1 thresholds $S_1$ to $S_{N-1}$, with $S_1 < S_2 < S_3 < \ldots < S_{N-1}$. Various sets of values can be used. The set of values giving the best results in terms of reduction in overcrowding phenomena during testing periods may ultimately be retained for the operational phase.

In one embodiment, these values $S_1$ to $S_{N-1}$ are representative of data volumes.

In step 100 of prior configuration, a value indicating a duration is defined respectively for each queue. Thus the duration value $T_i$ is assigned to queue $Q_i$, i=1 to N. The set of duration values $\{T_i\}_{i=1 \text{ to } N}$ ultimately retained can be defined on completion of a period of experimentation testing several sets of values $(T_i)_{i=1 \text{ to } N}$.

In the first embodiment considered, when the packet transfer module 10 receives a new packet, for example a packet P13, the latter is provided as input to the classifying block 11.

In a classifying step 101, the classifying block 11 determines the class to which the packet P13 received belongs, as a function of information indicated in the packet P13. In the present case, the classifying block 11 identifies the communication to which the packet received P13 belongs, as a function of the following elements:
- the IP addresses of sources and destination,
- the source port and destination port (which identify respectively the application, on the terminal from which the communication originates, which gave rise to the communication and the application, on the recipient terminal to which the communication is addressed, for which the communication is intended),
- and the index number of the protocol used within the IP protocol.

If the communication thus identified has no counter value stored in the memory 15 in association with an identifier of the communication, the value of a counter is then initialized to a zero value, and then stored in association in the memory 15 with an identifier of the communication.

Next the classifying block 11 updates the value of the counter associated with the communication to which the packet P13 received belongs, by adding to the value stored in the counter the data volume corresponding to this new packet received P13. In the embodiment considered, the data volume corresponding to a packet is equal to 1 (the unit is the packet; the counter thus tots up the number of packets already received for one and the same communication). In another possible embodiment, the data volume of a packet is equal to the size of the packet.

According to one embodiment the initialization of the counter and the updating of the counter are performed only if the packet to be classified is retained by a sampling procedure.

For example, the communication identified is the communication C1 for the packet P13 received. In the present case, it turns out that the communication C1 already has a packet P11 in queue $Q_1$ and a packet P12 in the queue $Q_2$.

Next, the classifying block 11 compares the value of the counter for the identified communication with the thresholds $S_1$ to $S_N$, and then determines the class as a function of the result of these comparisons, in the following manner.

If the updated value of the counter is less than the threshold $S_1$, the class $CL_1$ is allocated to the packet received and the packet is added to the queue $Q_1$ associated with the packets of class $CL_1$.

If, with i integer ∈ [1, N−2], the updated value of the counter is greater than or equal to the threshold $S_i$ and less than the threshold $S_{i+1}$, the class $CL_{i+1}$ is allocated to the packet received and the packet is added to the queue $Q_{i+1}$ associated with the packets of class $CL_{i+1}$.

If the updated value of the counter is greater than the threshold $S_{N-1}$, the class $CL_N$ is allocated to the packet received and this packet is added to the queue $Q_N$ associated with the packets of class $CL_N$.

If no counter has been initialized for the identified communication, it is considered that this counter is zero during the comparison with the thresholds $S_1$ to $S_{N-1}$.

In the present case, the updated value of the counter associated with the communication C1 is greater than or equal to the threshold $S_1$ and Less than the threshold $S_2$. The packet P13 is therefore added to the back of the queue $Q_2$.

Similarly, when the packet transfer module 10 thereafter receives a new packet, for example a packet P24, it identifies that the communication stream to which the packet received P24 belongs is the communication stream C2.

In the present case, a packet P21 is in the queue $Q_1$ (as may be seen, the queues can contain packets of different communications) and two packets P22 and P23 are in queue $Q_2$.

If the packet P21 is retained by a sampling procedure then the classifying block 11 updates the counter associated with the communication C2 to which the packet P24 received belongs, by adding 1 to the value stored in the counter.

Next, the classifying block 11 compares the value of the counter for the communication C2 with the thresholds $S_1$ to $S_N$. If no counter has been initialized for the communication C2, the block 11 will proceed by considering a zero counter value.

In the present case, the updated value of the counter associated with the communication C2 is greater than or equal to the threshold $S_2$ and less than the threshold $S_3$. The packet P24 is therefore added to the back of the queue $Q_3$.

These operations are repeated during the reception of new packets by the transfer module 10.

Moreover, while the classifying block 11 is distributing packets received in the various queues $Q_1$ to $Q_N$, the selection block 14, in a step 102, successively selects the queues so as to provide by priority packets extracted from these selected queues to the resource 12.

When a queue is selected by the block 14, packets are extracted therefrom by the block 14, which provides them by priority (with respect to the packets extracted from a queue selected subsequently) to the shared resource 12.

When the queues are of FIFO type, and when a queue has been selected so as to extract therefrom packets to be provided by priority to the shared resource, the packets extracted from this queue are by priority the packets that have been present in the queue for the longest time.

The queue can be selected as a function of an iterative procedure for scheduling the N queues.

The scheduling procedure can be of various types, depending on the embodiments.

For example, the scheduling procedure can be based on the principle of traversing the queues in sequence one after the other ("round robin" principle).

In another embodiment, the scheduling procedure can be based on the principle of aiming to provide the resource with the same throughput of data from each queue (principle of "fair queueing").

In another embodiment, the scheduling procedure can be based on the principle of aiming to provide the resource with weighted throughputs of data from the respective queues (principle of "weighted fair queueing"): for example, a throughput $4.D_0$ for queue $Q_1$, a throughput $3.D_0$ for queue $Q_2$ etc, where $D_0$ is a given throughput value.

In another embodiment, the scheduling procedure can be based on the principle of aiming to provide the resource with predetermined throughputs for groups of queues, organized in the form of trees or otherwise (principles of "class based queueing", used especially in the Linux operating system or of "hierarchical token bucket").

Whatever principle is the basis of the scheduling procedure for successively selecting the queues within which packets will be successively provided to the resource 12, the selection block 14, in the implementation of the scheduling procedure, is constrained to select at least one packet in each non-empty queue $Q_i$ for each period of duration $T_i$ defined previously.

Thus, it is guaranteed that if the queue $Q_i$ is non-empty, with i=1 N, one or more packets will be extracted from the queue at least every $T_i$ seconds, for example, if the value of $T_i$ is expressed in seconds.

A minimum throughput of packet extraction is therefore guaranteed for each queue.

A portion of the bandwidth of the link L2, which is here the shared resource to which the packets are transferred, is thus dedicated to each non-empty queue or else to each class of packets which is associated with a non-empty queue.

In a particular embodiment, we choose $T_1=T_2=\ldots=T_N$ and the bandwidth portion dedicated to each queue is for example fixed equal to 1/Nth of the bandwidth of the link L2.

The transfer of the packets is therefore regulated, while making it possible to decrease the overcrowding without interrupting communications.

In one embodiment, it is required that if a waiting list is empty, the portion of the packet extraction throughput which is dedicated to it is reassigned to the extraction of the packets from other queues. Thus the capacity of the resource is utilized to the maximum.

In one embodiment, there is furthermore defined a minimum size K, such that the selection block 14, in the implementation of the scheduling procedure, is constrained, to select a minimum of packets of overall size greater than K, in each non-empty queue $Q_i$ for each period of duration $T_i$ defined previously, with i=1 to N.

In one embodiment, there is furthermore defined, in step 100 of prior configuration, a maximum size for each of the queues, in terms of number of packets or size of data (obtained by multiplying the number of packets by the size of the packets).

Thus when a queue has attained its maximum size and as long as its size has not decreased, the new packets received which ought to be added by the classifying block 11 to this queue, are rejected. Nevertheless, any other scheme for filling the queues can also be used, without this having an impact on the effectiveness of the method according to the invention. Thus in another filling scheme, when a queue has attained its maximum size and as long as its size has not decreased, the new packets received which ought to be added by the classifying block 11 to this queue, could replace packets present in the queue.

As seen, in the first embodiment described above, steps 101 and 102 make it possible not to block communication packets because of the throng of packets of other communications that consume a great deal of resource at a given moment. These communications are in particular so-called elastic communications which have a tendency to occupy, during the longer or shorter time that the communication lasts, a big share of the available resources through which they pass (for example the throughput available on a communication link). Such communications are for example file transfers or else Web server queries.

In a second embodiment, the packet transfer module 10 furthermore comprises, within the classifying module 11, a prefiltering block 13 and an extra queue $Q_0$. The manner of operation of the transfer module 10 is then modified in the fashion described below with respect to the first embodiment described previously.

When the transfer module 10 receives a packet P that has to be transferred to the resource 12, the prefiltering block 13 determines whether the packet received satisfies at least one condition. Then, depending on the result of the check, the module 10 does or does not perform the determination of the class as indicated in step 101.

Depending on the embodiments, the prefiltering block 13 determines whether one or more of the following conditions (combined for example in the form of AND, OR logic functions) is satisfied:

a/ "the packet is transmitted in accordance with a determined protocol";

b/ "the packet has been sent by a determined application implemented in the source terminal or is intended for a determined application implemented in the recipient terminal";

c/ "the packet belongs to a communication stream whose throughput is less than a determined threshold";

d/ "the packet belongs to a communication stream for which a total number of packets present in said queues is less than a predefined threshold".

If the packet received P satisfies the condition or conditions adopted, the packet P does not undergo the step of determining class such as described above in step 101. In one embodiment, the prefiltering block 13 then dispatches the packet to another processing block. In another embodiment, the prefiltering block 13 dispatches the packet to an additional queue $Q_0$.

In a case where an additional queue is created, a minimum duration $T_0$ is assigned to the queue $Q_0$. The conduct of the selection, described above in step 102 with reference to the queues $Q_1$ to $Q_N$, is in such a case modified by considering N+1 queues $Q_0$ to $Q_N$ instead of the N queues previously considered. A portion of the processing throughput for the resource 12 is thus dedicated to the packets of each queue $Q_0$ to $Q_N$.

For example, in one embodiment, we fix $T_0=T_i=T_2=\ldots=T_N$. The throughput of transfer to the shared resource is thus divided into N+1 portions, each of these portions being dedicated to a respective class of packets and is used to transfer packets of the queue associated with this class. The size of these portions is different from 0, except if a queue is empty. In this case, the size of the portion dedicated to this queue is zero.

If the packet P received does not satisfy the condition or conditions, the packet then undergoes the step of determining class such as described above in step 101.

Checking conditions a/ to c/ makes it possible to detect packets requiring particular processing and not requiring to be regulated in the same manner as packets of the communications which tend to occupy a maximum of throughput (for example those of the elastic communications).

Checking condition a/, "a protocol associated with the packet is a protocol of determined type", makes it possible to detect packets for example of UDP type, which need to be transferred according to a fixed minimum throughput, independently of the volume of the communication to which the packet belongs.

Checking condition b/, "the packet has been sent by a determined application in the source terminal or is intended for a determined application in the recipient terminal" makes it possible to detect packets which need to be transferred rapidly, since they belong to communications generated or intended for applications requiring fast transfer. These applications include for example Telnet (making it possible to take control of a remote computer screen), which gives rise to the sending of numerous packets.

Checking condition c/, "the packet implements a communication associated with a throughput which is less than a determined threshold" makes it possible not to penalize a communication having a long temporal duration and therefore generating many packets in total, while having a small number or packets generated per unit time: for example the communications of networked games between a player and a games applications server. Here again, it is important for the packets to be processed rapidly. Furthermore, such packets do not contribute appreciably to the overloading of a resource. It is therefore not necessary to regulate them in the same manner as the communications which take a big share in the overloading of a resource. To check this condition it is necessary, at the level of the filtering block, to determine the throughput of the communications.

Checking condition d/, "the packet implements a telecommunication corresponding to a number of packets in at least one queue, that is less than a predefined threshold" makes it possible not to penalize communications of the type of those aimed at by checking condition c/, nevertheless without having to determine the throughput of a communication at the level of the filtering block.

Thus the second embodiment makes it possible not to subject particular packets to the time lags caused before transfer to the resource, such as are caused by the application of a method in accordance with the first embodiment.

In one embodiment, the prefiltering can take place in a separate module, arranged upstream, from the transfer module 10, instead of the block 13. Nevertheless, logging the communications, as is required by the steps carried out in the prefiltering, is expensive in terms of processing capacities. It is therefore advantageous not to have to carry out this operation in two separate places, and therefore to carry out this prefiltering within the transfer module 10, which must also log the communications for the classifying step 101.

In one embodiment, the network 2 is a network in which a majority of the packets circulating comply with the TCP protocol. The TCP protocol provides for a mechanism which manages the flow of the packets. Indeed, when at the level of the terminal from which the packets originate, a large slowdown in the transmission to the recipient terminal of the packets is detected (as a function for example of the rate of receipt of messages acknowledging receipt of packets), the throughput of sending of the packets by the terminal from which the packets originate is then greatly decreased. In such a case, the periods of duration $T_1$ to $T_N$ are defined so as to guarantee most of the time a transfer of the packets to the resource before such self-adjustment operations are triggered.

The invention is thus aimed at proposing a solution for regulating the transfer of packets destined for a shared resource, which makes it possible to limit the overcrowding phenomena at the level of the resource, while guaranteeing continuous flow of the packets of all the types of communications, without totally interrupting the flow of certain communications.

It makes it possible to benefit from the advantages of the solutions of the third type without having the drawbacks thereof. In particular, the implementation of a method according to the invention at several points of a network does not lead to an inefficient use of the resources. Furthermore, it makes it possible to avoid the self-adjustment phenomena, and their consequences, in the case of TCP communications.

A method in accordance with the invention can be implemented with a view to transferring data to any type of shared resources. These shared resources can be transmission links, arbitrary items or equipment that have to process packets (routers, DSLAMs, etc.) and that may therefore give rise to overcrowding phenomena in the case of a large number of incoming packets. The method can then be implemented in a transfer module upstream of the resource, particularly if the resource is of link type, or else in a first processing stage of the resource, especially if the resource is of equipment type.

In one embodiment, at least certain of the steps described above, especially those carried out by the classifying block 11 and/or the selection block 14, are implemented following the execution, on processing means of the transfer module 10, of instructions of computer programs.

The above method has been described in a network of Internet type. It can of course be implemented in any type of network adapted for transmitting data packets.

A method according to the invention can be implemented in any entity intended to transfer data packets to a resource with a view to their processing by the resource. Such an entity is for example an item of equipment of the network core such as a router or else an item, of equipment of an access network. Such an entity can also be terminals, such as mobile telephones, within the framework of applications of "data" type, or Personal Digital Assistants (PDAs). The method can also be implemented by ADSL modems or multimedia access boxes (conventionally giving access to Ethernet, TV and telephony) etc.

The invention claimed is:

1. A method of transferring data packets to a shared resource in a telecommunications network, the method comprising:
   receiving at least one packet to be transferred to a queue from among N processing queues each associated with a determined duration, where N>1;
   assigning the received packet to one of the N processing queues by at least:
     identifying a communication stream to which the received packet belongs;
     updating a value representative of the received data volume for the identified communication stream; and
       determining the queue to which the received packet is assigned as a function of the result of at least one comparison between the updated value and a determined threshold;
   adding the received packet to the queue to which the received packet has been assigned;
   selecting a processing queue from among the N queues such that each non-empty queue is selected at least once in the course of a time period of duration corresponding to the duration associated with the queue considered;
   extracting at least one packet from the selected processing queue; and
   transferring the extracted packet to the shared resource by priority with respect to the packets of the other queues.

2. The method as claimed in claim 1, further comprising not adding the received packet to any of the N queues, when the received packet satisfies at least one predetermined condition.

3. A method of transferring data packets to a shared resource in a telecommunications network, the method comprising:
- receiving at least one packet to be transferred to a queue from among N processing queues each associated with a determined duration, where N>1;
- determining, as a function of information contained in the received packet, whether the received packet satisfies at least one predetermined condition;
- assigning the received packet to one of the N processing queues, the queue to which the received packet is assigned being dependent on the result of the determination;
- adding the received packet to the queue to which the received packet has been assigned;
- selecting a processing queue from among the N queues such that each non-empty queue is selected at least once in the course of a time period of duration corresponding to the duration associated with the queue considered;
- extracting at least one packet from the selected processing queue;
- transferring the extracted packet to the shared resource by priority with respect to the packets of the other queues.

4. The method as claimed in claim 3, further comprising, on receipt of the received packet, choosing the at least one predetermined condition from among the following conditions:
- the received packet is sent in accordance with a determined protocol;
- the received packet has been sent by a determined application implemented in a source terminal or is intended for a determined application implemented in a recipient terminal;
- the received packet belongs to a communication stream whose throughput is less than a determined threshold; and
- the received packet belongs to a communication stream for which a total number of packets present in the queues is less than a predefined threshold.

5. A method of transferring data packets to a shared resource in a telecommunications network, the method comprising:
- receiving at least one packet to be transferred to a queue from among N processing queues each associated with a determined duration, where N>1;
- assigning the received packet to one of the N processing queues;
- adding the received packet to the queue to which the received packet has been assigned;
- selecting a processing queue from among the N queues such that each non-empty queue is selected at least once in the course of a time period of duration corresponding to the duration associated with the queue considered;
- extracting at least one packet from the selected processing queue;
- transferring the extracted packet to the shared resource by priority with respect to the packets of the other queues;
- not adding the received packet to any of the N queues, when the received packet satisfies at least one predetermined condition; and
- on receipt of the received packet, said choosing the at least one condition is from among the following conditions:
  - the received packet is sent in accordance with a determined protocol;
  - the received packet has been sent by a determined application implemented in a source terminal or is intended for a determined application implemented in a recipient terminal;
  - the received packet belongs to a communication stream whose throughput is less than a determined threshold; and
  - the received packet belongs to a communication stream for which a total number of packets present in the queues is less than a predefined threshold.

6. A device for transferring data packets to a shared resource in a telecommunications network, the device comprising:
- receiving means for receiving at least one packet to be transferred to a queue from among N processing queues each associated with a determined duration, where N>1;
- assignment means for:
  - assigning the received packet to a queue from among the N processing queues, and
  - for at least some of the received packets, identifying a communication stream to which the received packet belongs, updating a value representative of the received data volume for the communication stream identified, and determining the queue to which the received packet is assigned as a function of the result of at least one comparison between the updated value and a determined threshold;
- means for adding the received packet to the queue to which the received packet has been assigned by the assignment means;
- selection means for selecting a processing queue from among the N queues such that each non-empty queue is selected at least once in the course of a time period of duration corresponding to the duration associated with the queue considered;
- means for extracting at least one packet from the selected queue selected;
- means for transferring an extracted packet to the shared resource by priority with respect to the packets of the other queues.

7. A non-transitory computer-readable medium storing instructions that, when executed, cause a machine to at least carry out the method of claim 1.

* * * * *